United States Patent
Davis et al.

(10) Patent No.: US 8,021,556 B2
(45) Date of Patent: Sep. 20, 2011

(54) METHOD OF CLARIFYING INDUSTRIAL WASTEWATER FOR THE REDUCTION OF ORGANIC WASTE CONTENT USING CATIONIC DISPERSION POLYMERS COMBINED WITH POWDERED ACTIVATED CARBON AND ANIONIC FLOCCULENT POLYMERS

(76) Inventors: Stuart G. Davis, Fernandina Beach, FL (US); Robert A. Davis, Carmel, IN (US)

( * ) Notice: Subject to any disclaimer, the term of this patent is extended or adjusted under 35 U.S.C. 154(b) by 475 days.

(21) Appl. No.: 11/651,436

(22) Filed: Jan. 9, 2007

(65) Prior Publication Data
US 2007/0187334 A1 Aug. 16, 2007

Related U.S. Application Data

(63) Continuation-in-part of application No. 10/827,141, filed on Apr. 19, 2004, now Pat. No. 7,160,470, and a continuation-in-part of application No. 11/522,858, filed on Sep. 18, 2006, now Pat. No. 7,291,275.

(60) Provisional application No. 60/833,968, filed on Jul. 28, 2006.

(51) Int. Cl.
*C02F 1/28* (2006.01)
*C02F 1/56* (2006.01)

(52) U.S. Cl. ........ 210/666; 210/694; 210/714; 210/727; 210/731; 210/734; 210/735

(58) Field of Classification Search .................. 210/666
See application file for complete search history.

(56) References Cited

U.S. PATENT DOCUMENTS

| | | | | |
|---|---|---|---|---|
| 4,274,968 A | * | 6/1981 | Grutsch et al. | 210/666 |
| 4,668,404 A | * | 5/1987 | Walterick, Jr. | 210/666 |
| 4,737,293 A | * | 4/1988 | Walterick et al. | 210/666 |
| 6,319,412 B1 | * | 11/2001 | Reyna | 210/666 |
| 7,160,470 B2 | * | 1/2007 | Davis et al. | 210/708 |
| 7,291,275 B1 | * | 11/2007 | Davis et al. | 210/708 |

FOREIGN PATENT DOCUMENTS
EP 0001291295 A1 * 12/1984

* cited by examiner

*Primary Examiner* — Peter A Hruskoci
(74) *Attorney, Agent, or Firm* — Berenato & White, LLC

(57) ABSTRACT

A method is provided for clarifying wastewater containing contaminants including soluble organic compounds and insoluble organic compounds. The wastewater is treated with a paculant admixture including a cationic coagulant polymer and powdered activated carbon. The cationic coagulant polymer is polydiallydimethylammonium chloride, poly quaternary amine, and/or a starch-based organic polymer. After an at least 2 second delay, a flocculent is added to the wastewater to achieve (i) microcoagulation of the cationic coagulant polymer with the contaminants to form coagulated particles having an effective mass and cationic charge to react with an anionic flocculent to be added thereafter, and (ii) absorption of the soluble organic compounds on the powdered activated carbon. The anionic flocculent as added and reacted with the coagulated particles to form a sludge, containing agglomerated particles including the coagulated particles and powdered activated carbon, of sufficient size for mechanical removal. The sludge is removed to provide clarified wastewater.

31 Claims, 1 Drawing Sheet

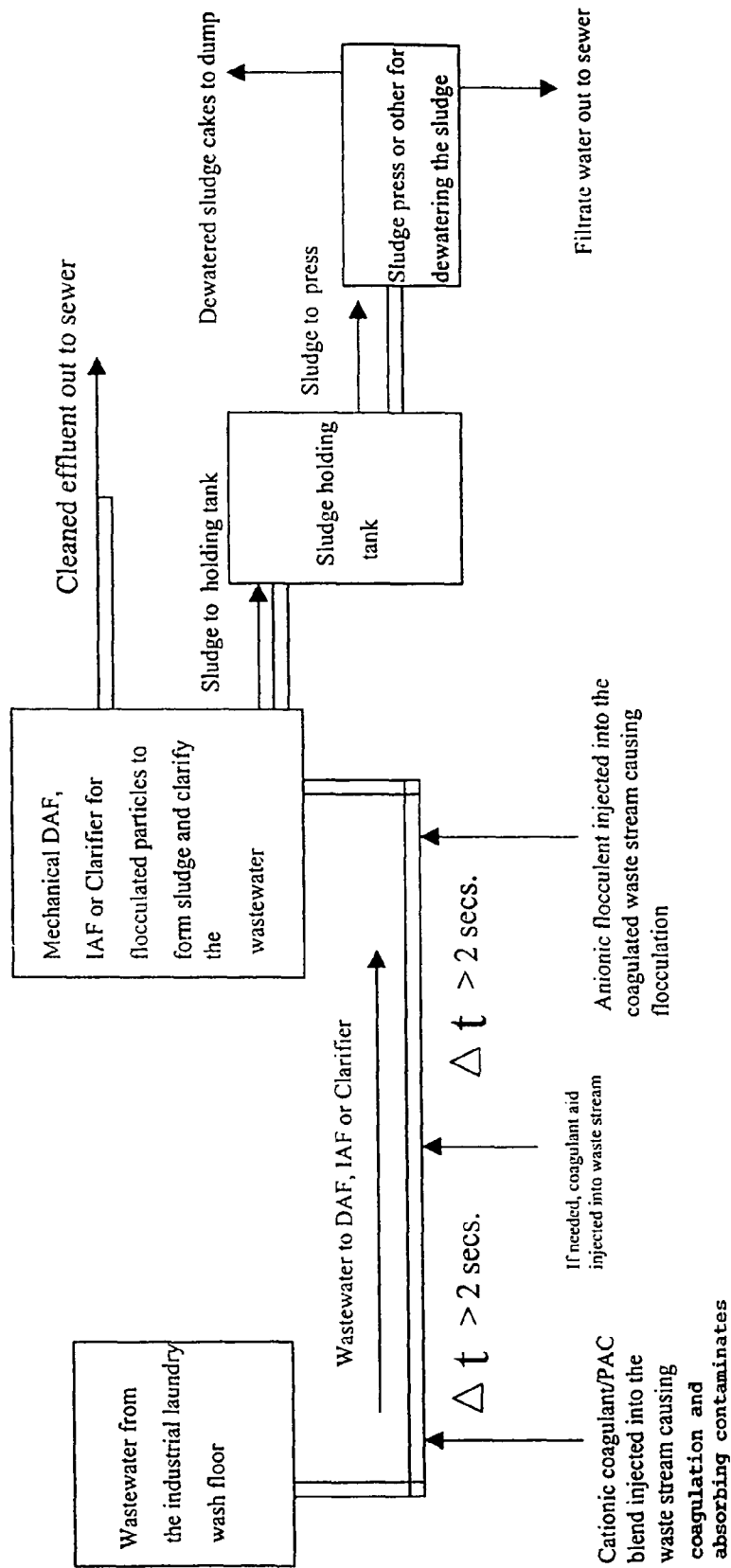

METHOD OF CLARIFYING INDUSTRIAL WASTEWATER FOR THE REDUCTION OF ORGANIC WASTE CONTENT USING CATIONIC DISPERSION POLYMERS COMBINED WITH POWDERED ACTIVATED CARBON AND ANIONIC FLOCCULENT POLYMERS

CROSS-REFERENCE TO RELATED APPLICATIONS

This application is a continuation-in-part of application Ser. No. 10/827,141 filed Apr. 19, 2004, now U.S. Pat. No. 7,160,470 is a continuation-in-part of application Ser. No. 11/522,858 filed Sep. 18, 2006 now U.S. Pat. No. 7,291,275 and also claims priority from Provisional Application Ser. No. 60/833,968 filed Jul. 28, 2006.

STATEMENT REGARDING FEDERALLY SPONSORED RESEARCH OR DEVELOPMENT

Not Applicable.

REFERENCE TO A MICROFICHE APPENDIX

Not Applicable.

TECHNICAL FIELD

This invention is directed to methods of clarifying industrial wastewater, specifically those wastewaters containing, soluble and insoluble organic compounds from a variety of sources including but not limited to industrial laundries, food manufacturing and processing, printing, and those industries where any organic matter is present in a wastewater matrix.

BACKGROUND OF THE INVENTION

In the industrial wastewater treatment field of solids/liquid separation, suspended and emulsified solids are removed from water by a variety of processes, including sedimentation, straining, flotation, filtration, coagulation, flocculation, and emulsion breaking among others. Additionally, after solids are removed from the wastewater they must often be dewatered. Liquids treated for solids removal often have as little as several parts per million (ppm) of soluble organic matter, or may contain several thousand ppm soluble organic matter. Solids being generated as sludge may contain anywhere from 0.1 to 6 weight percent solids prior to dewatering, and from 20 to 50 weight percent solids material after dewatering by a plate and frame press. Solids/liquid separation processes are designed to remove solids from liquids and the more solids generated in the process, the more costly its disposal.

While strictly mechanical means have been used to effect solids/liquid separation, the modern methods often rely on mechanical separation techniques that are augmented by synthetic and natural polymeric materials to accelerate the rate at which solids can be removed from water. These processes include the treatment of wastewater with cationic organic and inorganic coagulants that coagulate suspended particulates to form larger particles that then may be brought together by an anionic flocculent to create particles large enough to be removed from the waste stream by mechanical means, i.e., flotation or clarification. These methods have marginal success in the removal of soluble organic matter in the form of biochemical oxygen demand, semi-volatiles or volatile organic compounds without the addition of downstream treatment facilities or filters specifically designed for such removal to make the effluent suitable for industrial reuse or disposal in compliance with local permit discharge requirements.

In the industrial wastewater, the chemical treatment of wastewater to a typical municipal standard of 250 to 300 ppm of biochemical oxygen demand (BOD), (EPA method 304.5), 300 to 1200 chemical oxygen demand (COD), and the reduction of volatile and semi-volatile (henceforth called volatiles) compounds either individually or as an aggregate amount to the level of federal, state or local standards prior to the introduction of this invention has been: the hydraulic equalization of untreated wastewater followed by the metered flow of the wastewater through a pipe or tanks to provide for retention time for the injection of a variety of chemicals including combinations and individually, both organic and inorganic coagulants and aids, followed by an organic component flocculent to produce coagulation and flocculation. However after treatment by the above methods in streams containing sufficient amounts of influent BOD, COD and volatiles, treatment methods at times have not been sufficiently adequate to reduce these agents to acceptable discharge standards by either a surchargable or absolute standards.

Chemical treatment generally refers to the removal of non-settleable material by coagulation and flocculation. Chemical treatment for wastewater clarification is typically employed when colloidal and micro emulsified solids need to be removed so that the total petroleum hydrocarbons (TPH), fat, oil and grease (FOG), (BOD), (COD), volatiles total suspended solids (TSS), and other contaminants being discharged to a receiving stream need to be minimized. Typically, such treatment comprises using a cationic coagulant with one or more inorganic components, injected in combination or individually, followed by an anionic flocculent. Coagulation is the process of destabilization of the colloid waste particle by causing the coagulant (at 50-1000 ppm) to absorb by means of charge neutralization to form microfloc and impart residual cationic surface charge of the coagulated particles. The second step is to introduce a coagulant aid, i.e., ferric chloride, aluminum sulfate, ferrous sulfate, calcium chloride, polyaluminum chloride, typically at a rate of 75-700 ppm depending on the species, to increase the ability to form a more highly cationic surface that will cause the further adsorption of the coagulated particles onto the surface of an additional chemical, usually bentonite clay, at 200-900 ppm through a "sponge" effect. Flocculation occurs when the highly charged anionic flocculent bridges the previously formed cationic particles. Once neutralized, particles no longer repel each other and can come together to form larger agglomerated solids or sludge, which may then be removed from the water.

Clarification chemicals are typically utilized in conjunction with mechanical clarifiers including dissolved air flotation systems (DAF's) induced air flotation systems (IAFs), and settlers for the removal of solids from the treated water. The clarification chemicals coagulate and/or flocculate the suspended solids into larger particles, which can then be removed from the water by gravitational settling, flotation, or other mechanical means.

Processes for the preparation of high molecular weight cationic dispersion polymer flocculants are described in U.S. Pat. Nos. 5,006,590 and 4,929,655. High molecular weight, high active polymer cationic solution polymers for water clarification, dewatering and retention and drainage are disclosed in U.S. Pat. No. 6,171,505.

BRIEF SUMMARY OF THE INVENTION

The invention is directed to methods of clarifying industrial wastewater, specifically industrial laundry wastewater, to produce a compliant effluent reductions of COD, BOD and volatiles heretofore unrealized with only chemical treatment using a two part system of wastewater coagulants (blended and non-blended pDADMAC, polyamine or starch based coagulants) followed by a poly(acrylamide-co-acrylate) flocculent. Furthermore, the sludge produced using this invention will dewater in a typical plate and frame press, belt press or vacuum filter with or without the use of any other organic or inorganic compounds added to the waste stream or sludge. The use of substances such as slurried bentonite clay, ferric chloride or other stand alone metal salts can be used as a coagulant aids without departing from this invention.

This invention pertains to the use of a cationic aqueous coagulant solutions containing polydiallydimethylammonium chloride (pDADMAC), poly quaternary amine (poly amine), or starch based organic polymers non blended or blended with either each other or inorganic metal salts including but not limited to ferric chloride, ferrous sulfate, aluminum sulfate, aluminum chlorohydrate (also known by other names i.e. ACH, also known as partially neutralized polyaluminum chloride) and poly aluminum chloride. These inorganic metal salts may also be introduced into the wastewater matrix separately from the coagulants. These coagulants and metal salts are used to produce, in the chemical demulsification of industrial wastewater, cationic charged particles.

In accord with this invention powdered activated carbon (herein PAC) is also mixed in the coagulant solution. The PAC is utilized in the treatment of the wastewater to further treat in situ the wastewater for BOD, COD and volatile compound removal. The PAC does not interfere with the primary reaction created by the coagulants and metal salts for the primary treatment of the industrial wastewater. The PAC reacts with the BOD, COD, and volatile compounds remaining after the first microflocculation. It is the properties of PAC that permit it to reduce these pollutants through secondary absorption reaction with organic compounds.

Once these particles are created and the wastewater is initially cleaned in a charge neutralization and absorption reaction by the coagulants with or without the metal salts and the secondary removal is created by the PAC premixed in the coagulant solution, the wastewater is cleaned using a low to high molecular weight low to very highly charged cationic solution coagulant (polymer) premixed with an inorganic aluminum species as one product, followed by a low to very high molecular weight anionic flocculent, i.e., poly(acrylamide-co-acrylate), (also known herein as sodium acrylate flocculent) with a 5% charge or higher (preferably 50% or higher), added in solution to produce particulate of sufficient size to be removed by physical means. The wastewaters, to which this invention is directed, may be produced by the food, ink & printing, pulp and paper processing industries along with the industrial cleaning of products, including but not limited to: uniforms, shop towels, ink towels, mats, rugs, bar mops, aprons, coveralls and coats, used to protect personnel from manufacturing or commercial wastes.

The creation of the wastewater stream can be through the use of all available commercial equipment that is used by the above industries. These streams must then be collected in such a way as to promote the batch collection or intermittent or continuous flow of the stream. This collection of wastewater then may be further treated by batch or flow proportion as to allow for the injection and mixing of treatment chemicals by primary coagulation and flocculation only. This invention cleans the wastewater and increases the ability of the coagulant solution to remove BOD, COD and semi-volatile compounds by as much as 300% (depending on the analyte of concern). Furthermore, at the proper doses, this invention allows the sludge to be dewatered in equipment pertinent to this function with or without coagulant aids heretofore mentioned for improving dewatering characteristics The specific invention herein relates to the wastewater batch, or the in-stream use of the coagulant polymers (non-blended or blended with each other or metal salts) with PAC (blended coagulant with PAC which may be called a paculant) mixed directly into the coagulant solution as a finished product ready for field distribution. The field use paculant is injected into the wastewater stream in a diluted or an undiluted form, at any point prior to the sodium acrylate acrylamide flocculent injection with approximately ten (10) seconds interval (or more) between the injections. The paculant must be injected in the correct empirical quantity and given a sufficient predetermined time to begin and complete the microcoagulation of the waste particles, during the time the highly water miscible coagulant is "washed off" the PAC particle in the coagulant solution. The reaction time necessary for this to be accomplished varies depending on the various types of wastewater streams being treated, and also may be accomplished by the strength and/or dilution of coagulant solution by water. The PAC is then left in a state able to absorb remaining amounts of organic pollutant as to be of a reduction of these pollutants in the treated wastewater effluent. This reaction needs at least two (2) seconds and the flocculent must be injected in the correct empirical quantity and given sufficient time to begin and complete the flocculation of the coagulated particles prior to dewatering. The paculant and flocculent must be injected in sufficient quantity to create the appropriate conditions in the sludge that allow for the dewatering of the sludge generated by this process. These injection or dosing ratios are critical to the overall performance of the invention.

The liquid, emulsified, or dry anionic flocculent is made into any solution strength (commonly between 0.05-0.5%, 0.2% being preferred), and injected post coagulant by at least a two (2) second interval (10 seconds being preferred) and in sufficient empirical quantities as to cause coagulated wastewater to form flocculated waste particles of sufficient size to settle in clarification or rise by flotation, as by dissolved/induced air or other means.

The combination of the paculant and the flocculent in the wastewater stream produces an effluent that has been demonstrated to reduce organic compounds as much 300% from typical treatment schemes depending on the analyte of concern. The process testing of this invention has shown these reductions to be typical of the specific application of the invention disclosed herein.

The flocculants of this invention must be of sufficient charge density, molecular weight and added in sufficient quantities, as to aid in all dewatering mechanisms, typically being a plate and frame press often found in typical plants.

BRIEF DESCRIPTION OF THE DRAWING

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, which illustrates schematically an industrial laundry wastewater treatment system embodying features of this invention.

DETAILED DESCRIPTION OF THE INVENTION

In accordance with the present invention, methods are provided for removing contaminants from an aqueous solution.

Methods are provided for removing: surfactants, phenolics, total petroleum hydrocarbons, fats oil and grease, TSS contributors, BOD contributors, COD contributors, TOC contributors, and organic soluble material from an aqueous solution. The surfactants, phenolics, total petroleum hydrocarbons, fats, oil and grease (FOG), TSS contributors, BOD contributors, COD contributors, and TOC contributors from an aqueous solution are removed by adsorption onto a carrier precipitate which is formed in situ within the aqueous solution. In each of the embodiments of the invention the preferred method involves rapidly forming the precipitate.

The method of the invention can be used to remove the following contaminants from the industrial wastewater stream: TSS contributors, BOD contributors, COD contributors, TOC contributors, and/or fats, oil and grease (FOG). The invention will now be described first with respect to FOG, TSS contributors, BOD contributors, COD contributors, and TOC contributors. Unless otherwise stated, all process and apparatus parameters disclosed for FOG removal are equally effective for the removal of the other contaminants as well. Likewise, unless otherwise stated, all process and apparatus parameters disclosed for the removal of the other non-volatile contaminants are equally effective for heavy metal removal as well.

"Coprecipitation" as used with respect to the invention described herein refers to the chemical phenomenon where, within an aqueous solution containing a cationic carrier precipitate precursor, an anionic carrier precipitate precursor, and one or more coprecipitant precursors, the cationic and anionic carrier precipitate precursors are caused to chemically react and precipitate out of the aqueous solution as carrier precipitate particles; and, as the carrier precipitate particles are formed, coprecipitant precursors are removed from the aqueous solution by adsorption onto the surface of the carrier precipitate particle and/or by occlusion within the interior of the carrier precipitate particle.

The coprecipitant reaction is very rapid. Typically, more than 85 weight percent, and usually more than ninety-nine (99) weight percent, of the oil and grease are removed from the waste solution within about 10 seconds after the formation of the agglomerated particle.

Finally, the methods of the invention are superior to conventional precipitation methods in that these methods treat the organic soluble material remaining in the water after the initial microflocculation has taken place. The aqueous polymeric coagulants and metal salts used in creating blends used in the methods of this invention are made by several manufacturers. The PAC used in the methods of this invention is manufactured by several manufacturers. The first chemical used in the invention is mixed in controlled conditions with a percent by weight of PAC ranging from 0.5% to 25%.

By accepted definition, powdered activated carbon is activated carbon that is smaller than 80 mesh. Representative sizes for the activated carbons sold include 50-60% 200 mesh to 600 mesh, 60% less than 325 mesh, and 90% less than 325 mesh. Though even finer grinds can be used, its source can be any of the materials used to make activated carbon-wood, sawdust, bituminous and sub bituminous coals, anthracite, coconuts, lignite, peat, or petroleum stocks. The characteristics of the activated carbon are the direct result of the type of material used. The majority of powdered carbons sold in the world are those derived from wood, lignite, and coals. On the basis of the source for the activated carbon, the carbons are made into powder and will vary according to their density, ash content, pore volume distributions, and adsorptive properties, representative of their total surface areas. For this invention one such property of the carbon is the iodine number, which measures surface area and pores less than 28 angstroms in size, and it is used to grade carbons used in the water field. Another such property is the molasses number, which is a measure of macroporosity and the availability of transport pores. The materials used to make the powder can also be acid washed to lessen their ash content prior to grinding. Acid washed materials generally show a slight increase in apparent density, and a lessening of their iodine number of between 50 and 100 points. For the purpose of this invention the PAC used may have the characteristic properties of being both water-soluble and non-water soluble.

The size of the pores on the PAC allow it to be placed in the coagulant mixture without the coagulant being absorbed in a quantity to render the PAC ineffective in the absorption of soluble organic material remaining after reaction. The larger size organic molecules (>1000 angstroms) of the coagulant are too large in size to fill the pores of the PAC particles. This then allows the PAC particle to remain in suspension in the primary coagulant mixture without significant change of the PAC soluble organic reduction properties.

This completed PAC and coagulant mixture or paculant is injected into the waste stream in empirical quantities of typically 50-700 parts per million (ppm), depending primarily on stream flow rate, mix times, or strength, to cause the coagulation of negatively charged waste particles. The characteristic of water-soluble coagulants to disperse within an aqueous solution rapidly causes release of the surrounded PAC particle by allowing it to be "washed" of coagulant by the surrounding wastewater. As the pore sites on the PAC become available, these sites then are able to become the locations at which soluble organic compounds are then attached.

The resulting coagulated particle then has sufficient mass and residual cationic charge to react with the subsequent addition of the pre-described, water dispersed anionic flocculent to create an agglomerated particle of sufficient size for removal by mechanical means. It is during the step of flocculation that the pollutant laden PAC particle is caught in a sweep reaction during this agglomeration. The flocculent is injected into the waste stream after a predetermined time to permit the cationic blend to substantially complete the coagulation of the particles by at least two (2) seconds after the injection of the coagulant blend in empirical quantities of 1-50 ppm. The time interval for the coagulant to sufficiently absorb the waste particles prior to injection of the flocculent must be no less than two (2) seconds but longer time may be required. Sufficient passive or active mechanical action must take place between the wastewater and the coagulant to allow the intimate commingling of the waste particles with the coagulant prior to addition to the flocculent.

The anionic flocculent must be of a molecular weight, as termed in the industry, low to "very high" and of a charge density of no less than five percent (5%) and up to 100% but usually around fifty percent (50%). Again depending on wastewater stream strength the preferred range of 7-30 ppm of flocculent is needed to flocculate the coagulated particles to a level where the additional use of other coagulant aids and/or dewatering aids is not necessary, but may be used if desired.

Using this invention has shown to aid in the reduction of soluble organic compounds by as much as 300% depending of the analyte of concern.

The following examples are set forth to illustrate this invention and render same more understandable but are not intended to limit the scope of the herein disclosed and claimed invention.

EXAMPLE ONE

Laundry plant #1 has a daily average water usage of 65,000 gallons per day with 50% of the input product being shop towels, mats, ink wipers and other heavy soils. The prior existing program being used for industrial pretreatment was a poly (diallydimethylammonium chloride) mixed with aluminum chlorohydrate solution with a dose rate of 200-500 ppm residence time for each chemical being 15-20 seconds at 125 gpm flow. This created coagulated particles that were then flocculated with a 0.2% polyacrylate flocculent at 6-8 ppm to produce particles able to be floated through mechanical means. The plate and frame press produced dewatered sludge cakes amounting to 60 cubic feet per day. Typical BOD results from effluent analysis ranged from 450 ppm to over 2000 mg/l.

The method of this invention was used to replace the prior existing program with a dose rate of 200-400 ppm of paculant [PAC and a poly (diallydimethylammonium chloride) mixed with aluminum chlorohydrate solution being the primary coagulant] using a mix time of approximately 20 seconds, and the application of the flocculent at 20-30 ppm using a mix time of approximately 40 seconds, resulting in floc that was floated through mechanical means.

Effluent COD analysis showed that during operation effluent COD ranged from >150 to 295 mg/l. No change in the amount of sludge generated was seen nor degradation in other effluent quality parameters.

EXAMPLE TWO

Laundry plant #2 with a daily average water usage of 80,000 gallons per day with 40% of the input product being shop towels, mats, ink wipers and other heavy soils. The prior existing program being used for industrial pretreatment was a poly (diallydimethylammonium chloride) mixed with aluminum chlorohydrate solution with a dose rate of 200-700 ppm residence time for each chemical was approximately six minutes for the first chemical and 10 seconds for the second chemical at 60 gpm flow. This created coagulated particles that were then flocculated with a "wetted" 0.2% polyacrylate flocculent at 6-8 ppm to produce particles able to be floated through mechanical means. Typical COD results from effluent analysis ranged from 800ppm to over 2000 mg/l.

The method of this invention was used to replace the then existing program with a dose rate of 200-700 ppm of paculant using a mix time of approximately six minutes, and the application of the flocculent at 20-30 ppm using a mix time of approximately 40 seconds, resulting in floc that was floated through mechanical means.

Effluent COD analysis showed that during operation effluent COD ranged from >150 to 295 mg/l. No change in the amount of sludge generated was seen nor degradation in other effluent quality parameters.

We claim:

1. A method for clarifying wastewater, comprising:
    treating wastewater containing contaminants comprising soluble organic compounds and insoluble organic compounds with a paculant admixture comprising a cationic coagulant polymer and powdered activated carbon, the cationic coagulant polymer comprising at least one member selected from the group consisting of polydiallydimethylammonium chloride, poly quaternary amine, and a starch-based organic polymer;
    delaying an addition of a flocculent to the wastewater for a period of delay of at least 2 seconds after said treating of the paculant admixture sufficient to achieve (i) microcoagulation of the cationic coagulant polymer with the contaminants to form coagulated particles having an effective mass and cationic charge to react with an anionic flocculent to be added thereafter and (ii) absorption of the soluble organic compounds on the powdered activated carbon;
    adding the anionic flocculent and permitting the anionic flocculent to react with the coagulated particles to form a sludge, comprising agglomerated particles including said coagulated particles and said powdered activated carbon, of sufficient size for mechanical removal; and
    removing the sludge to provide clarified wastewater.

2. The method recited in claim 1, wherein the cationic coagulant polymer comprises organic molecules of at least 1000 angstrom.

3. The method recited in claim 1, wherein the cationic coagulant polymer comprises organic molecules too large in size to attach to pores of the powdered activated carbon.

4. The method recited in claim 1, wherein the powdered activated carbon is 80 mesh or finer.

5. The method recited in claim 1, wherein the paculant admixture consists of the cationic coagulant polymer and the powdered activated carbon.

6. The method recited in claim 1, wherein the paculant admixture is premixed with an inorganic aluminum species.

7. The method recited in claim 1, wherein the paculant admixture is added into the wastewater in an amount of 50-700 ppm.

8. The method recited in claim 1, wherein the paculent is an injectable polymeric suspension.

9. The method recited in claim 1, wherein the period of delay is at least approximately 10 seconds.

10. The method recited in claim 1, wherein the anionic flocculent is introduced in an amount of 1 to 50 ppm.

11. The method recited in claim 1, wherein the anionic flocculent is introduced in an amount of 7 to 30 ppm.

12. The method recited in claim 1, wherein the anionic flocculent comprises poly(acrylamide-co-acrylate).

13. The method recited in claim 1, further comprising adding a process aid selected from the group consisting of slurried bentonite clay and metal salts prior to said adding of the anionic flocculent.

14. The method recited in claim 1, further comprising adding a process aid selected from the group consisting of ferric chloride, ferrous sulfate, aluminum sulfate, aluminum chlorohydrate, and poly aluminum chloride.

15. The method recited in claim 1, further comprising dewatering the sludge to mechanically remove the agglomerated particles.

16. The method recited in claim 1, further comprising optionally adding a process aid from the group consisting of slurried bentonite clay and metal salts prior to said adding of the anionic flocculent.

17. The method recited in claim 1, wherein the cationic coagulant polymer comprises polydiallydimethylammonium chloride.

18. A method for clarifying wastewater, comprising:
    treating wastewater containing contaminants comprising soluble organic compounds and insoluble organic compounds with a paculant admixture comprising a cationic coagulant polymer and powdered activated carbon, the cationic coagulant polymer comprising at least one member selected from the group consisting of polydiallydimethylammonium chloride, poly quaternary amine, and a starch-based organic polymer;

delaying an addition of a flocculent to the wastewater for a period of delay of at least 2 seconds after said treating of the paculant admixture sufficient to achieve (i) microcoagulation of the cationic coagulant polymer with the contaminants to form coagulated particles having an effective mass and cationic charge to react with an anionic flocculent to be added thereafter and (ii) absorption of the soluble organic compounds on the powdered activated carbon;

adding the anionic flocculent in an amount of 1 to 50 ppm and permitting the anionic flocculent to react with the coagulated particles to form a sludge, comprising agglomerated particles including said coagulated particles and said powdered activated carbon, of sufficient size for mechanical removal, the anionic flocculent comprising poly(acrylamide-co-acrylate); and removing the sludge to provide clarified wastewater.

19. The method recited in claim 18, wherein the cationic coagulant polymer comprises organic molecules of at least 1000 angstrom.

20. The method recited in claim 18, wherein the cationic coagulant polymer comprises organic molecules too large in size to attach to pores of the powdered activated carbon.

21. The method recited in claim 18, wherein the powdered activated carbon is 80 mesh or finer.

22. The method recited in claim 18, wherein the paculant admixture consists of the cationic coagulant polymer and the powdered activated carbon.

23. The method recited in claim 18, wherein the paculant admixture is premixed with an inorganic aluminum species.

24. The method recited in claim 18, wherein the paculent admixture is an injectable polymeric suspension.

25. The method recited in claim 18, wherein the period of delay is at least approximately 10 seconds.

26. The method recited in claim 18, wherein the anionic flocculent is introduced in an amount of 7 to 30 ppm.

27. The method recited in claim 18, further comprising adding a process aid selected from the group consisting of slurried bentonite clay and metal salts prior to said adding of the anionic flocculent.

28. The method recited in claim 18, further comprising adding a process aid selected from the group consisting of ferric chloride, ferrous sulfate, aluminum sulfate, aluminum chlorohydrate, and poly aluminum chloride.

29. The method recited in claim 18, wherein the method further comprises dewatering the sludge to mechanically remove the agglomerated particles.

30. The method recited in claim 18, further comprising optionally adding a process aid from the group consisting of slurried bentonite clay and metal salts prior to said adding of the anionic flocculent.

31. The method recited in claim 18, wherein the paculant admixture is added into the wastewater in an amount of 50-700 ppm.

* * * * *